Figure 1:
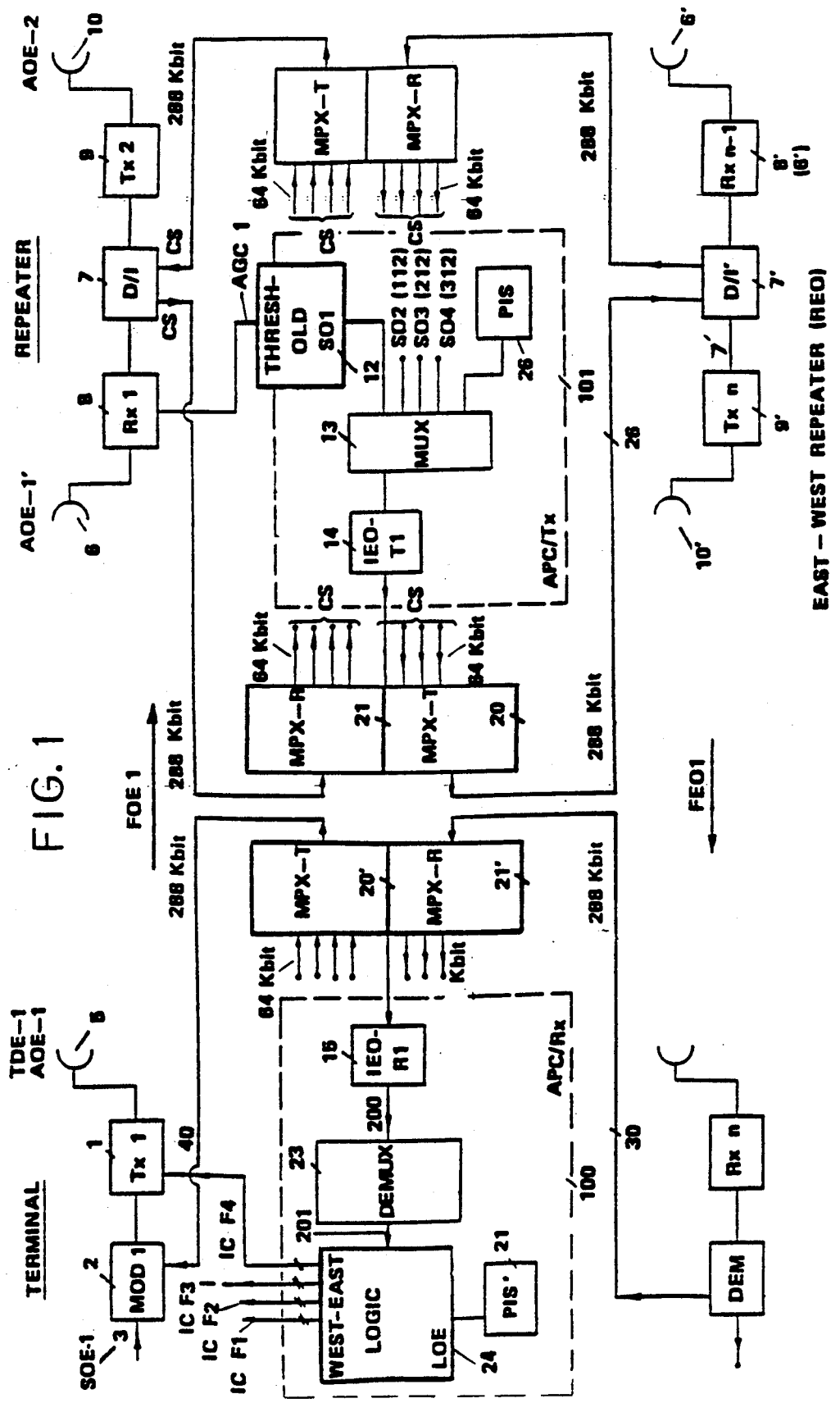

United States Patent [19]

Nannicini et al.

[11] Patent Number: 4,993,021

[45] Date of Patent: Feb. 12, 1991

[54] AUTOMATIC TRANSMIT POWER LEVEL CONTROL IN RADIO LINKS

[75] Inventors: Maurizio Nannicini, Monza; Luigi Vismara, Vimercate, both of Italy

[73] Assignee: Telettra-Telefonia Elettronica e Radio Spa, Italy

[21] Appl. No.: 261,443

[22] Filed: Mar. 23, 1989

[51] Int. Cl.⁵ .......................... H04J 3/12; H04J 1/16; H04J 3/14

[52] U.S. Cl. .................. 370/77; 370/110.1; 370/17; 375/58; 375/60; 455/52; 455/63; 455/69

[58] Field of Search .................. 370/77, 13, 13.1, 17, 370/18, 19, 20, 32, 74, 97, 98, 110.1; 455/24, 50, 52, 57, 17, 63, 69, 58, 78; 178/1.4 C; 375/58, 60, 76, 98; 371/5, 34

[56] References Cited

U.S. PATENT DOCUMENTS

| | | | |
|---|---|---|---|
| 4,309,771 | 1/1982 | Wilkens | 455/69 |
| 4,731,866 | 3/1988 | Muratani et al. | 455/69 |
| 4,752,967 | 6/1988 | Bustamante et al. | 455/69 |
| 4,777,653 | 10/1988 | Bonnerot et al. | 455/69 |

*Primary Examiner*—Douglas W. Olms
*Assistant Examiner*—Wellington Chin
*Attorney, Agent, or Firm*—Ostrolenk, Faber, Gerb & Soffen

[57] ABSTRACT

The automatic transmit power level control in multiline radio links using a multilevel QAM modulation is basically comprised of:

means to derive a threshold signal for each RF channel in each receiver, means to multiplex all threshold signals from the individual receivers, means to insert an appropriate signal in the said multiplexer as necessary to identify the station which it comes from, means to further multiplex the said multiplexed signal with other service signals, means to insert this dual-multiplexed signal in the frame of the main information signal sent to the other direction of transmission, means to receive and demultiplex the received signal two times, means to process the said demultiplexed signal so as to derive, on one hand, a transmit power level control signal, protected from possible faults or malfunctions of the main transmit digital channel and, on the other hand, the station identification signal, means to apply the said control signal to the pre-distortion circuit in the transmit power amplifier.

5 Claims, 4 Drawing Sheets

AUTOMATIC TRANSMIT POWER LEVEL CONTROL IN RADIO LINKS

DESCRIPTION OF THE INVENTION

The present invention refers to an automatic power control (APC) system in signal transmissions between transmitting and receiving stations via radio link, and specifically radio links using digital modulation techniques.

An embodiment of the invention refers to the radio links using multilevel QAM modulation in multiline systems equippable with up to 11+1 radio channels.

The invention also includes the circuits for the implementation of the subject system.

The automatic power control in radio transmission is described in the literature. Specifically, U.S. Pat. No. 4,004,224 describes a method whereby the operation of all transmitters in a link takes place, during no-fading periods, with a power level lower than that normally used in the periods during which there is fading. In fading periods, the transmit power in the link is automatically increased by a command sent to the transmitter by the remote receiver associated therewith, on an auxiliary channel. Each transmitter-associated remote receiver set requires a power control device comprised of a received power level detector; a comparator which compares the signal corresponding with this level to a reference value, a modulator which modulates the said control signal and inserts it in the high frequency transmission system used for the information signal. Obviously, the said APC device also includes a control signal demodulator, that drives a power amplifier gain regulator circuit. In U.S. Pat. No. 4,495,648 relevant to a type of automatic power control, a proportionality is established in the transmitter-associated receiver set (for example, Rx/Tx A) between the level of the received signal ($V_{11}$) and the amplitude of a dc voltage (Vdc) at the output from the automatic gain control (AGC) circuit in the receiver. The frequency of the ac voltage (Vac) at the output from an FM switch is proportional to the amplitude of the Vdc voltage. In the transmitter the transmit signal $V_{12}$ is amplitude modulated by a modulating signal at a frequency equal to that of the Vac voltage. Consequently the FM-AM modulation superimposed to the transmit signal carries the information of the received signal level.

In Rx/Tx B the amplitude modulation frequency of the received signal $V_{13}$ determines the frequency of an ac voltage (Vac) at the output from the AGC circuit in the receiver. The amplitude of the Vdc voltage output from a FM discriminator, which is proportional to the frequency of the Vac voltage, controls the power level output from the transmit RF amplifier. Consequently the level of the $V_{10}$ signal transmitted by transmitter 10 is related to the level of the $V_{11}$ signal received by receiver 11.

These and other conventional embodiments techniques are not easily applicable to all transmission systems using digital modulation, for example to multilevel QAM systems. In addition, whereas mention is made in these techniques to the need of complying with the linearity requirements of the transmission circuits and the interference problems, they don't propose any solutions that may be effectively applied to radio equipment using multilevel QAM modulation systems. Also, there are no specific references to the use of the APC technique in communications systems comprised of several radio channels. Now the scope of the present invention is an automatic transmit power control (APC) technique that does not present the drawbacks mentioned hereabove and specifically has no restrictions in its applications.

Another purpose of the invention is to provide an automatic power control (APC) that is specifically effective in radio transmissions using multilevel QAM modulation.

A further objective of the invention is to provide an APC for radio link systems comprised of several RF channels (multiline systems), using digital service channel equipment, preferably multiplexes and digital drop-/insert devices, for transmitting the control signals necessary to control the said RF channels. Another purpose of the invention is to provide an APC with a continuous control of the transmitter linearity and a simultaneous substantial reduction of the interference problems.

These and other objectives are achieved using a control according to invention, comprised of:
 means to derive a threshold signal for each RF channel in each receiver,
 means to multiplex all threshold signals from the individual receivers,
 means to insert an appropriate signal in the said multiplexer as necessary to identify the station which it comes from,
 means to further multiplex the said multiplexed signal with other service signals,
 means to insert this dual-multiplexed signal in the frame of the main information signal sent to the other direction of transmission,
 means to receive and demultiplex the received signal two times,
 means to process the said demultiplexed signal so as to derive, on one hand, a transmit power level control signal, protected from possible faults or malfunctions of the main transmit digital channel and, on the other hand, the station identification signal,
 means to apply the said control signal to the pre-distortion circuit in the transmit power amplifier.

The other characteristics of the invention are specified in the sub-claims.

The various features and advantages of the present invention will be better understood through the preferred (but not limiting) embodiments illustrated in the attached drawings, wherein FIGS. 1 through 4 are functional block diagrams.

FIG. 1 is a functional block diagram of the system in accordance with the present invention, applied, as an example, to the transmission-reception of four RF channels in the west to east direction, and four radio channels in the east to west direction. For sake of simplicity, FIG. 1 shows only one terminal (TOE.1), and specifically that from west to east, comprised of a modulator (MOD.1) which modulates the information signal to transmit, SOE.1 (3); the true transmitter TX1 (1) and the respective antenna A.0.E.1 (5). The repeater receiver (6) conventionally includes the corresponding receiver RX1 (8) connected with antenna A.0.E.1' followed by the service channel (CS) drop/insert (D/I) circuit (7), and by transmitter TX2 (9) connected with antenna A.0.E.2 (10) that is part of the subsequent radio hop.

According to a feature of the invention, a threshold circuit $SO_1$ (12) is associated with each of receivers RX1 (8) (the remaining ones (RX2, RX3 and RX4) are not intentionally indicated); the said threshold circuit outputs a digital signal to an information multiplexer MUX (13) that also receives the remaining threshold signals $SO_2$ (112), $SO_3$ (212) and $SO_4$ (312) and generates a frame, for example at a bit rate of 64 Kbit/s, carrying the information coming from the threshold circuits to be sent back in the west direction, through an appropriate east-west interface circuit IEO-T1 (14), for example of the standard G.703 contradirectional type.

According to the invention, the signal output from interface IEO-T1 (14) (at a bit rate of 64 Kbit/s) is subsequently fed to the transmit section MPX-T (20) of a service multiplexer, wherein it is multiplexed together with other (for example, three) similar signals at 64 Kbit/s; the service multiplexer outputs, on line 25, a signal at, for example, 288 Kbit/s that is fed to drop/insert equipment D/I' (7') of the east-west repeater, R.E.O. (6'), that feeds signal 7" to transmitter TXn (9') that feeds it to antenna 10'. The signal radiated by the antenna reaches receiver RXn, where it is demodulated in the DEM block, and is fed, through line 30, to demultiplexer MPX-R (receive side) (21'). MPX-R outputs the various signals (four in the case considered in the figure) at 64 Kbit/s, one of which is fed to interface I.E.O.-R1 (15), the output signal of which (200) is demultiplexed and paralleled in DEMUX (23). The output signal 201 is, according to the invention, processed in the O-E logic (O.E.-24) that performs a number of critical functions:

(1) extracts the station identification word PIS inserted in 26 and compares it to a word PIS' generated locally in 27;

(2) extracts the information necessary to control the transmit powers of the individual RF channels ICF1, ICF2, ICF3, ICF4 (in the case considered in the figure, that shows only four channels). The control signal, for example ICF1, is typically applied to transmitter TX1 (1) through line 40 and specifically, as it will be better explained later on, to the pre-distortion circuit in the amplifier of TX1;

(3) performs filtering and alarm management functions on the received signals, so as to protect the APC system from faults and malfunctions of the digital channel used to transmit the APC information;

(4) the local and remote manual control operations.

Figure 2:
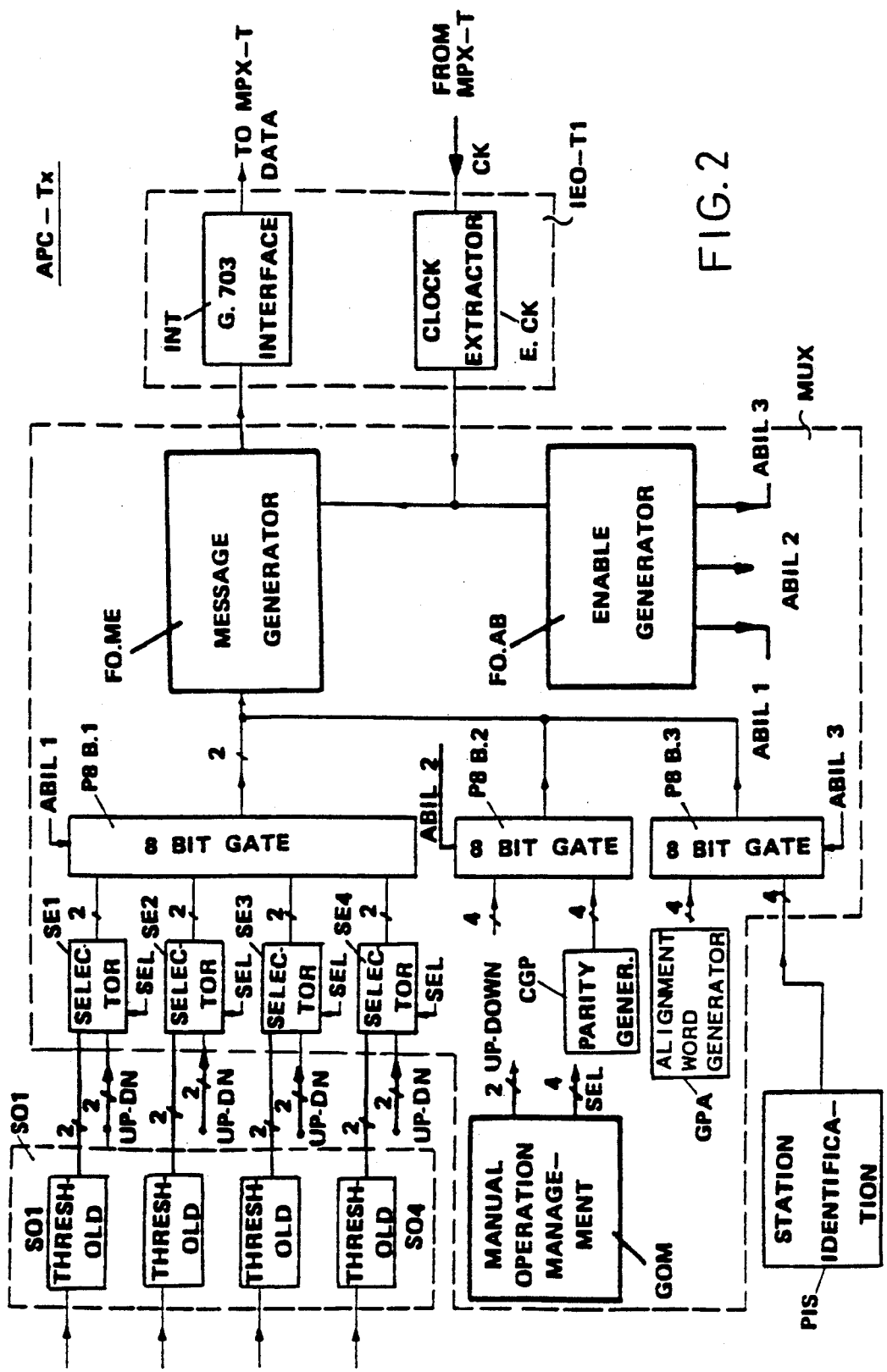

FIG. 2 is a functional block diagram of a preferred embodiment of the APC/TX, i.e. that associated with the transmitter and enclosed in dashed rectangle 101 in FIG. 1.

FIG. 2 shows for "threshold" circuits, SO1 through SO4, relevant to the four controlled RF channels of one direction (for example east to west, E-O). These signals are sent to four "selector" circuits, SE1 through SE4, which also receive a manual operation control message UP/DOWN, and a manual/automatic select command SEL, both coming from the "manual operation management" circuit (GOM).

The 8-bit word from the four selector circuits, SE1 - SE4, is stored in a 8-bit gate (1) P8B1. The 8-bit gate (2) P8B2 receives and stores four manual/automatic select information bits SEL, coming from the "manual operation management" circuit GOM, and four parity bits coming from a "parity generator" circuit CGP. The 8-bit gate (3) P8B3 receives and stores four alignment bits coming from an "alignment word generator" circuit GPA, and four station identification bits coming from a "station identification word generator" circuit PIS. The 8-bit gates (1), (2), (3) are enabled alternatively under the control of an "enable generator" circuit FO.AB, and the 8-bit words are serialized in a "message generator" circuit FO.ME, the 64 Kbit/s output from which is sent to a "G.703 interface" INT and from here to the transmit section of the service channel multiplex used, MPX-T.

The timing signals for "message generator" FO.ME and "enable generator" FO.AB circuits are supplied by a "clock extractor" circuit E.CK, which receives a 64 KHz clock CK from the transmit section of the service multiplex.

Figure 3:
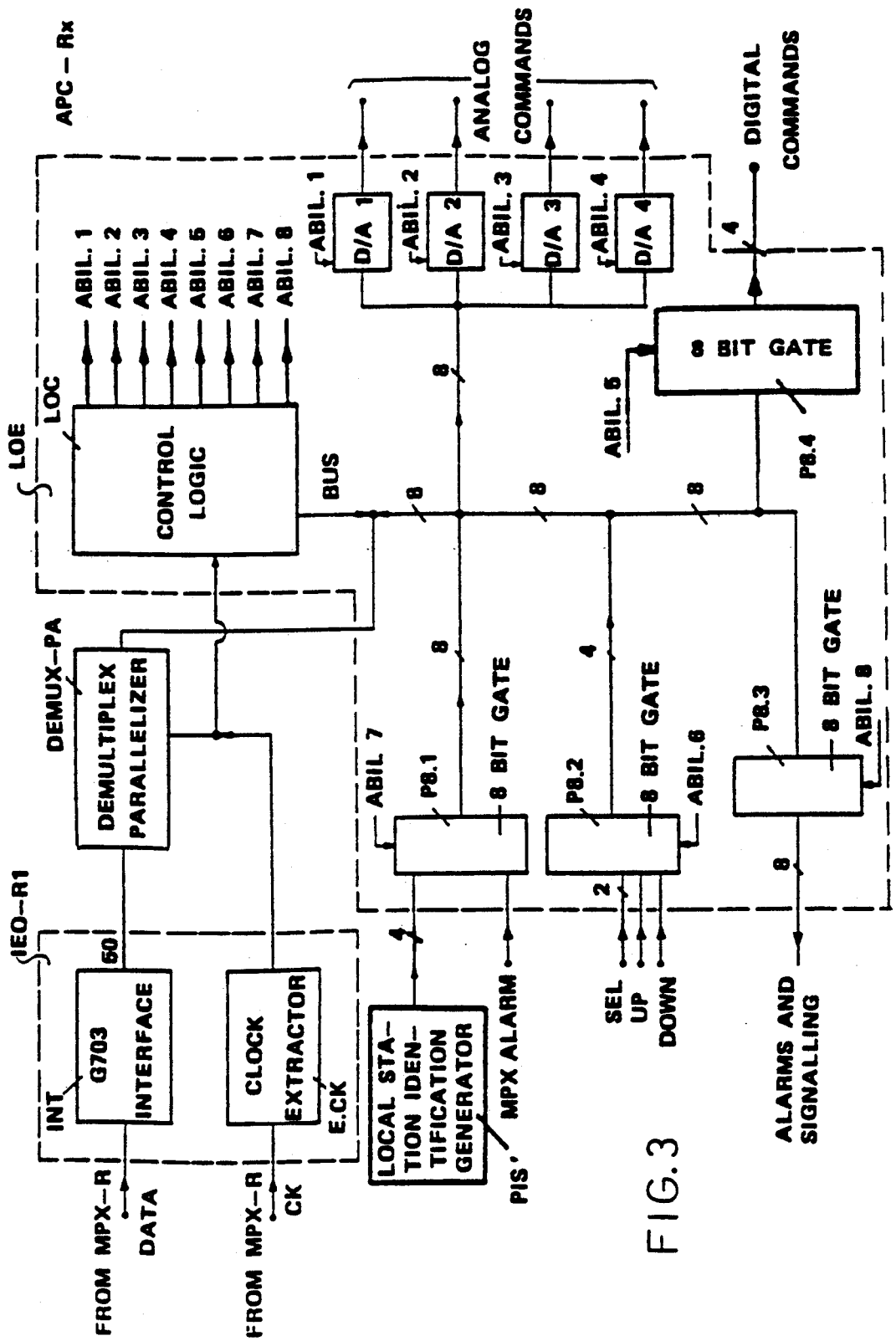

FIG. 3 is a functional block diagram of a preferred enbodiment of the APC/Rx, i.e. that associated to the receiver and enclosed in dashed rectangle 100 in FIG. 1. In FIG. 3 the signal received from the receive section of service channel multiplex MPX-R is fed to an "interface" circuit INT, for example of the G703 type, the output from which (50) feeds a demultiplexer-parallelizer block DEMUX-PA that outputs the information bits on a bus (BUS), for example an 8-bit bus, connected with a control logic LOC. The 64 KHz clock signal CK, also received from the receive section of the service channel multiplex MPX-R, is fed to the "clock extractor" circuit E.CK that provides the timing signals necessary for the said "demultiplex-parallelizer" DEMUX-PA and the "control logic" LOC. The said control logic LOC also receives on the bus, from a "8-bit gate (1)" P8.1, the station identification word locally generated by a "station identification word local generator" PIS', and a service channel multiplex alarm, if any. The control logic also receives on the bus, from the "8-bit gate (2)" P8.2, the local manual-automatic select information SEL and the transmit power increase-decrease commands UP/DOWN, which, if the local manual operating mode has been selected for a channel, make it possible to by-pass the corresponding remote command. The same control logic LOC processes all information received on the bus (both that generated in the local station and that generated in the remote station) and outputs, through the bus, the following information:

(a) to the "8-bit gate (4)" PB.4: the information relevant to the 4 digital control signals that will be sent by the said "8-bit gate (4)" to the four radio transmitters respectively controlled;

(b) to the four digital/analog converters D/A1-D/A4: the digital information relevant to the continuous power control, that is transformed by the four D/A circuits into an equal number of analog control signals that are subsequently applied to the four radio transmitters respectively controlled;

(c) to the "8-bit gate (3)" PB.3: the alarm and signalling information.

The control logic manages the "8-bit gates" and the D/A converters by means of appropriate enabling signals Abil 1,2, 3,4,5,6,7,8.

Figure 4:
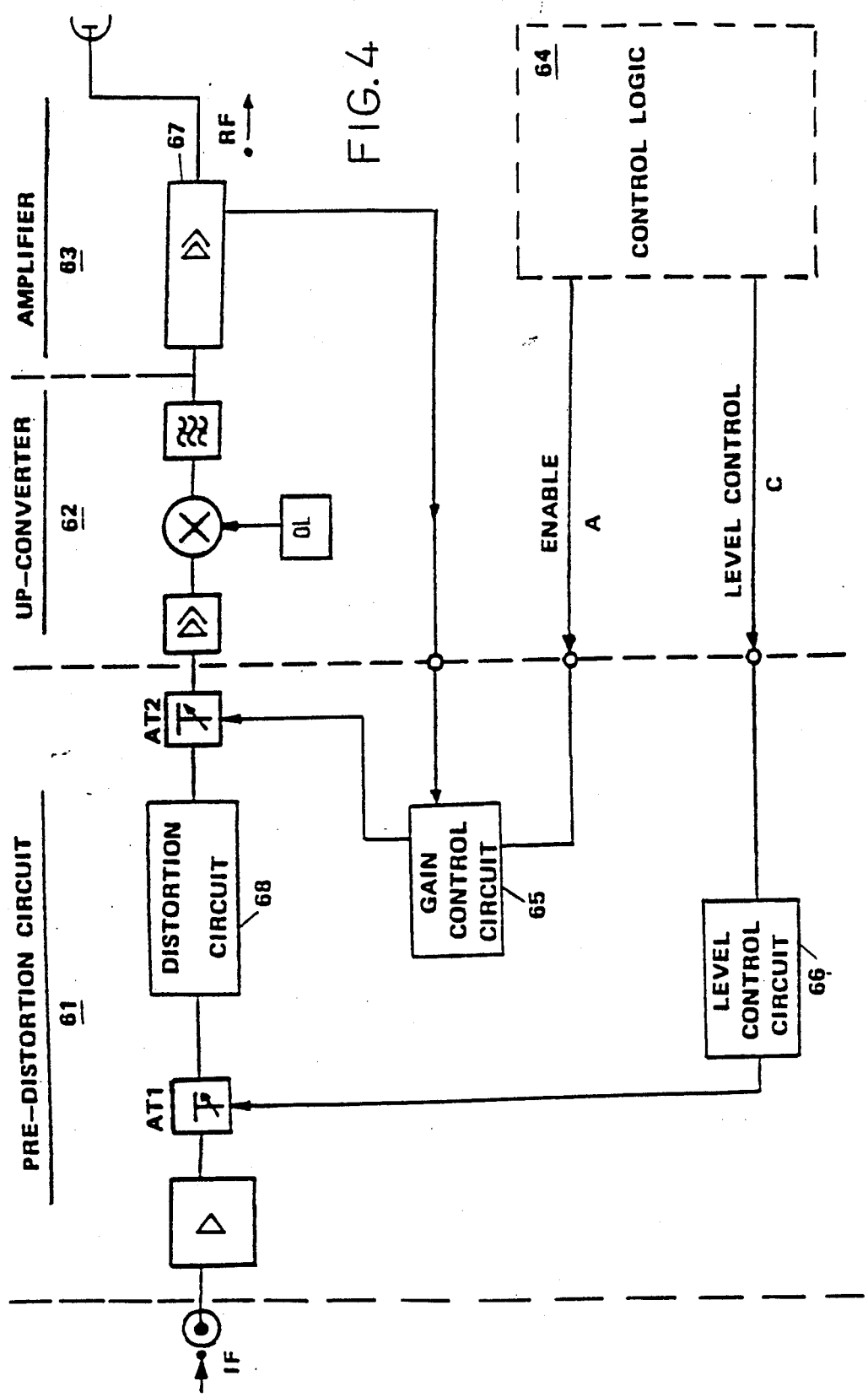

FIG. 4 is a functional block diagram of a transmitting section comprised of, in accordance with the invention, a predistortion circuit 61, an up-converter 62 and an RF amplifier 63. This functional block diagram emphasizes the operating method used to automatically control the transmit power level, that is the scope of the present invention.

This operating method makes use of two distinct commands coming from control logic LDC 64, the former of which is an enabling command A and the second is a transmit power level control command C.

Whenever the automatic control system is activated (under fading conditions), enabling signal A operates in such a way that circuit 65, that controls the amplifier gain, stores and keeps the said gain stored for all the time during which the automatic control system is operational.

Transmit power level control signal C, which is activated simultaneously with signal A, regulates the attenuation of AT1, via circuit 66, so as to implement the desired power level variation at the transmitter output, point 67. Level control signal C operates onto attenuator AT1 and results in a decreased attenuation, and consequently in an increased transmit power level, whenever a fading condition occurs, whereas it results in an increased attenuation and consequently in a decreased transmit power level whenever the fading condition disappears.

The variation of attenuation in AT1, produced by control circuit 66 and driven by signal C, is continuous. The operation onto attenuator AT1 to increase and decrease the transmit power level is accompanied by a simultaneous increase and decrease of distortion generated by distortion circuit 68. By operating as described hereabove, the distortion generated by circuit 68 varies exactly by the same amount as the distortion of amplifier 63 in function of its output power level.

Since the distortion generated by distortion circuit 68 is complementary to that of amplifier 63, the overall distortion of the transmitter is kept stable down to a low value.

Among the most significant features and advantages of the invention, we mention the following ones:

(1) The power control is implemented inside a predistortion circuit associated with the transmitter, so as to activate it during the percentages of time when power is increased (0.01% of the time) and disactivate it when the system operates at a reduced power level; this solution is such that the microwave power amplifier operates under high linearity conditions for almost all the time (99.99%), which is a requirement for the aforementioned multilevel QAM systems, without loosing the corrective effect of the pre-distortion circuit during the small period of time during which the power level is the maximum one.

(2) The regulation of the transmit power level takes place continuously. The nominal power level (i.e. the attenuation with respect to the max. transmitter power level) and the APC circuit operating threshold, are determined. The APC circuit operating threshold increases the transmit power within the operating range of the driver, according to the law of variation of the fading.

(3) The proposed APC system is applicable to high capacity digital radio links using multilevel QAM modulation systems and its embodiment according to the invention is very well suitable for expanding the system configurations up to 11+1 RF channels.

(4) A station identification system has been introduced, to prevent the risk of receiving an APC control signal coming from a different station in the case of the operation of a protection circuit, for example because of a drop/insert circuit by-passed in a repeater station.

(5) The system takes full advantage of control message convalidation techniques, whereby the transmit power level is frozen at the nominal level in the case of faults or malfunctions in the channel used to transmit the information (see, for example, the logic present in APC/RX (100)).

(6) The system includes a manual maintenance control providing facilities for local and remote controlled operations.

(7) The system characteristics of the proposed solution and their implementing modes make it possible an easy expansion of the power control to system configurations comprised of several RF channels, up to max. 11+1.

(8) It is also highligthed that the automatic transmit power level control in accordance with the present invention does not affect at all the pre-existing local transmit power control, which counteracts variations in the environmental operating conditions and components aging. The present invention has been described with reference to preferred embodiment, in order to make the explanation easier to understand; however it is susceptible of variations, modifications and replacements that, being accessible to technicians having an average skill in the sector, naturally fall in the wider spirit of the present invention.

We claim:

1. A transmit power control system for multiline radio links using microwave signal digital modulation, specifically multilevel QAM modulation, in each RF transmitter which receives, from a respective receiver associated therewith, a signal indicating the levels of useful signals received on that RF channel and sends said signal back to said associated transmitter in order to regulate said transmit power level, comprising:

means for deriving a threshold signal for each RF channel in each receiver;

means for multiplexing each threshold signal from each receiver;

means for inserting an appropriate signal in said multiplexer as necessary to identify the station which it comes from;

means for further multiplexing said multiplexed signal with other service signals;

means for inserting the twice-multiplexed signal in the frame of the main information signal sent to the other direction of transmission;

means for receiving and twice demultiplexing the received signal;

means for processing said demultiplexed signal so as to derive: (i) a transmit power level control signal protected from possible faults or malfunctions of the main transmit digital channel and (ii) the station identification signal; and means to apply said control signal to the predistortion circuit in the transmit power amplifier.

2. A system as claimed in claim 1, further comprising means for performing said power control manually.

3. A system as claimed in claim 1, wherein the predistortion circuit has a corrective effect on the distortion of the RF transmit amplifier only during the periods of time when the transmit power level is maximum.

4. A system as claimed in claim 1, wherein the predistortion circuit keeps the automatic transmit power control circuit operating when the automatic power control is not operating, by freezing the transmit power level when the automatic power control is operating.

5. A system as claimed in claim 1, wherein the predistortion circuit keeps the automatic transmit power control circuit operating by freezing the transmit power level.

* * * * *